US006687007B1

(12) United States Patent
Meigs (10) Patent No.: US 6,687,007 B1
(45) Date of Patent: Feb. 3, 2004

(54) COMMON PATH INTERFEROMETER FOR SPECTRAL IMAGE GENERATION

(75) Inventor: Andrew D. Meigs, Albuquerque, NM (US)

(73) Assignee: Kestrel Corporation, Albuquerque, NM (US)

(*) Notice: Subject to any disclaimer, the term of this patent is extended or adjusted under 35 U.S.C. 154(b) by 166 days.

(21) Appl. No.: 09/736,916

(22) Filed: Dec. 14, 2000

(51) Int. Cl.[7] ................................................. G01B 9/02
(52) U.S. Cl. ......................................................... 356/456
(58) Field of Search .............................. 356/456, 451, 356/455, 521, 483; 250/339.07, 339.08

(56) References Cited

U.S. PATENT DOCUMENTS

| 4,976,542 | A | | 12/1990 | Smith |
| 5,059,027 | A | | 10/1991 | Roesler et al. |
| 6,249,351 | B1 | * | 6/2001 | de Groot ..................... 356/512 |

OTHER PUBLICATIONS

W.L. Wolfe, Introduction to Imaging Spectrometers, Tutorial Text vol. TT 25, SPIE Optical Engineering Press (1997), pp. 50–52, 55–57, 60–64, 70–73.

T. Okamoto, et al., Optical method for resolution enhancement in photdiode array Fourier transform spectroscopy, Applied Optics, vol. 24, No. 23, Dec. 1, 1985, pp. 4221–4225.

J. Harlander, et al., Spatial Heterodyne Spectroscopy for the exploration of diffuse interstellar emission lines at far–ultraviolet wavelengths, The Astrophysical Journal, 396: 730–740, Sep. 10, 1992, pp. 730–740.

T.S. Turner, Jr., et al. A Ruggedized Portable Fourier Transform Spectrometer for Hyperspectral Imaging Applications, SPIE vol. 2585, (1995), pp. 222–232.

J. Harlander, et al., Spatial heterodyne spectroscopy: a novel interferometric technique for the FUV, SPIE vol. 1344 EUV, X–Ray, and Gamma–Ray Instrumentatioan for Astronomy (1990), pp. 120–131.

W.H. Smith, Digital Array Scanned Interferometers for Astronomy, Experimental Astronomy 1, 1991, pp. 389–405.

* cited by examiner

Primary Examiner—Samuel A. Turner
Assistant Examiner—Michael A. Lyons
(74) Attorney, Agent, or Firm—DeWitt M. Morgan; Matthew S. Wermager (57) ABSTRACT

Optical instruments having, inter alia, optics to process wavelengths of electromagnetic radiation to produce an interferogram. The instruments include at least one optical path and optical elements positioned along this path for splitting the electromagnetic radiation and spectrally dispersing the wavelengths to produce first and second sets of spectrally dispersed beams which interfere with each other to produce a plurality of different fringes of different wavelengths. The optics for dispersing the wavelengths includes a matched pair of gratings. The gratings may be reflective or they may be transmissive. The optics also includes a beam splitter and first and second mirrors. The gratings may be positioned in a variety of locations along the optical path. The instruments can also include a detector for detecting the interferogram and means for processing the detected interferogram to produce spectral information.

13 Claims, 10 Drawing Sheets

COMMON PATH INTERFEROMETER FOR SPECTRAL IMAGE GENERATION

GOVERNMENTAL RIGHTS CLAUSE

This invention is made with U.S. Government support under 29601-96-C-0096 awarded by the U.S. Air Force. The U.S. Government has certain rights in the invention.

FIELD OF THE INVENTION

The present invention relates to optical instruments which process wavelengths of electromagnetic radiation to produce an interferogram. More particularly, the present invention relates to instruments (e.g., Fourier transform spectrometers) which produce interferograms of a scene, which instruments include an optical system which both splits the incoming wavelengths and spectrally disperses them to produce two sets of spectrally dispersed beams. The dispersion is achieved by a matched pair of gratings or similar system. The instrument is useful in analyzing individual chemical species in absorption or emission spectroscopy where there is a need to image a time and spatially varying scene. This could be, for example, imaging an emission plume for a jet or rocket engine or a smoke-stack.

BACKGROUND OF THE INVENTION

Imaging spectrometers are, broadly speaking, optical instruments which process the electromagnetic radiation from a source into its fundamental components. For instance, an interferometer divides light from a source and interfers it to produce a fringe pattern of interfering light (i.e., an interferogram). The interference pattern can be captured on film or by, for instance, a semi-conductor array detector (e.g., a charged coupled device (CCD)).

Figure 1:
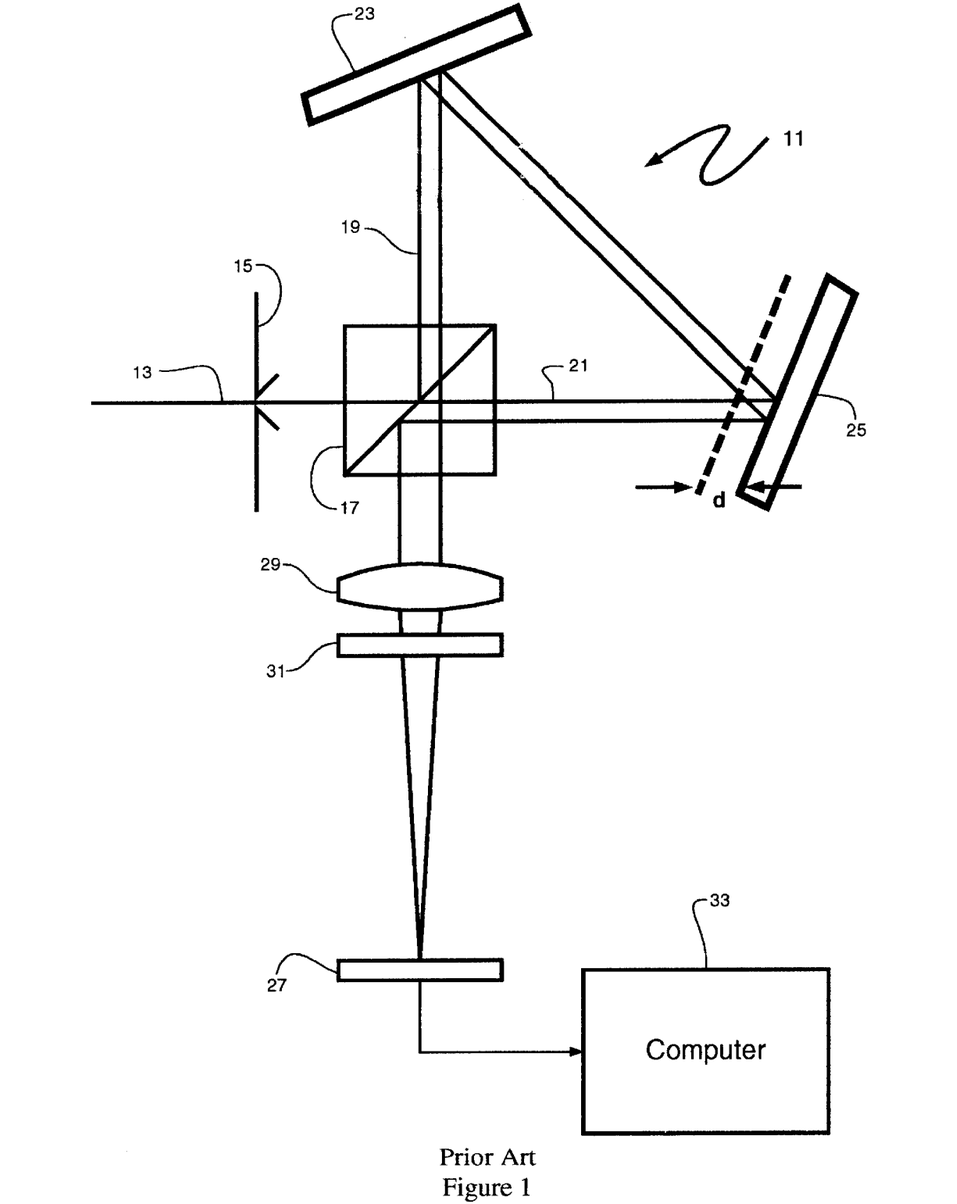
FIG. 1 is an optical schematic of a prior art spectrometer incorporating a common path or Sagnac interferometer.

There are numerous optical designs. The basic form of the Sagnac (or common path) interferometer is illustrated in FIG. 1. It is also illustrated in U.S. Pat. No. 4,976,542 to Smith. Other designs include the Mach-Zender interferometer, the Michelson interferometer and Twyman-Green interferometer (See W. L. Wolfe, Introduction to Imaging Spectrometers, SPIE Optical Engineering Press, pp. 60–64, 1997), the Fabry-Perot interferometer (see Wolfe, p. 70–73), the Lloyd's mirror interferometer (see the Smith patent) and, a variation of the common path interferometer (Sagnac) sometimes referred to as the Barnes interferometer (see T. S. Turner Jr., et al., A Ruggedized Portable Fourier Transform Spectrometer for Hyperspectral Imaging Applications, SPIE Vol. 2585 pp 222–232.) There are also dispersive spectrometers such as prism spectrometers and grating spectrometers. (See Wolfe pp. 50–52 and 55–57).

In a non-imaging Fourier transform spectrometer the point source of radiation is split into two virtual points a fixed distance apart to yield a fringe pattern at the detector. If one wants to attain a fine spectral resolution, the distance between the two virtual points should be large; for a course spectral resolution, it should be short. This distance may be controlled by shifting one of the mirrors (typically referred to as lateral shear) of, for instance, the common path interferometer. With this arrangement, a wide spectral range measurement loses resolution, while a high resolution measurement reduces the effective spectral range. In an imaging spectrometer, the point source is replaced with a slit giving the instrument the capability of one-dimensional imaging in the direction perpendicular to the shear.

In a conventional Fourier transform spectrometer, the interferogram records all spectral frequencies from the zero wavenumber to the upper spectral limit of the detector, even though the detector may not be able to sense this entire range. For a system utilizing a silicon detector that responds to wavenumbers from 10,000 to 25,000 $cm^{-1}$ (400 to 1000 nm), almost half of the information content in the interferogram is from frequencies that the detector cannot sense. The upper spectral limit of the interferogram (referred to as Nyquist limit of the detector) is determined by the ability of the detector to sample the interferogram properly.

Shear, both lateral and angular, is discussed in Turner, Jr. et al. (supra). For the Sagnac, translation of either mirror in the plane of FIG. 1 produces lateral shear. Mirror tilt about on axis perpendicular to the drawing plane also produces lateral shear. Conversely, in the Barnes interferometer only angular shear is possible and is produced only by mirror tilt. See FIGS. 2 and 3 of Turner, Jr., et al.

U.S. Pat. No. 4,976,542 to W. H. Smith discloses a Fourier transform spectrometer which incorporates the common path (or Sagnac) interferometer and in which a charge-coupled device (CCD) is placed in the image plane instead of film. The CCD has pixels aligned along two dimensions to provide both spectral resolution and spatial resolution. The CCD is characterized by greater dynamic range, lower pixel response variation, and is photon nose limited, all of which enhances its use as a detector for a spectrometer. See also Digital Array Scanned Interferometers for Astronomy, W. H. Smith, et al., Experimental Astronomy 1: 389–405, 1991. In these devices, the interferometer introduces a later shear in one direction and a two dimensional camera is aligned so a row of pixels is parallel to this geometric plane. In the perpendicular direction, a set of cylindrical lenses is used to provide an imaging capability along the columns of pixels. A row plot from the detector is an interferogram similar to the interferogram collected in a temporally modulated Michelson interferometer.

In a paper published in 1985, T. Okamoto et al. describe a method for optically improving the resolving power of the photodiode array of a Fourier transform spectrometer by modulating the spatial frequency of the interferogram with a dispersing element. With the use of a dispersing element, particularly an optical parallel, the distance between the two virtual sources varies with the wavenumber (the inverse of wavelength) of the source. Thus, as illustrated in FIG. 2 of this reference, by placing their optical parallel into the optical path of a common path interferometer, the distance between the virtual source becomes a function of the wavenumber (i.e., the optical parallel refracts the blue beam more than the red beam, yielding a wide distance between $S1_{blue}$ and $S2_{blue}$ and a narrower distance between $S1_{red}$ and $S2_{red}$). The authors claim that use of the optical parallel greatly enhances the resolution. In principle, the spectrometer can be designed to examine any wavelength band of interest by careful choice of the type of dispersive glass utilized and the thickness of the glass. See "Optical Method for Resolution Enhancement in Photodiode Array Fourier Transform Spectrocopy," T. Okamoto et al, Applied Optics Vol. 24, No. 23, pp 4221–4225, Dec. 1, 1985.

The approach of Okamoto et al. has a number of drawbacks. First, because of the use of the dispersive block, the system no longer operates with constant wavenumber increments. This is in contrast with conventional Fourier transform spectrometers, which are constant wavenumber devices and are inherently spectrally calibrated. Thus, with Okamoto et al., blue wavelengths have a much smaller spectral resolution than red wavelengths, and the spectral calibration of the instrument becomes a major issue. Another drawback is that the spectral dispersion, while it enhances spectral resolution, adversely affects spatial resolution. Thus, the dispersive element would greatly increase the complexity of an imaging Okamoto et al. spectrometer. Another disadvantage of this technique is that its dependence on a dispersive material restricts its use to wavelengths that can be effectively transmitted through a dispersive element. Finally, the limited glass types that are available restrict the range of spectral enhancements available. While it is theoretically possible to use any dispersive glass and increase the size of the block to achieve the desired spectral enhancement, in practice the size of the block may become so large that the instrument is no longer practical. Also, since the enhancement depends on the glass type and size, the instrument designer has a limited number of parameters to use to optimize the spectrometer design and may not be able to arbitrarily set the lower and upper limits of the spectral region of interest.

In "Spatial Heterdoyne Spectrocopy: A Novel Interferometric Technique for the FUV," J. Harlander et al., SPIE Vol. 1344, pp. 120–131 (1990), the authors describe an improved interference spectrometer which has no moving parts, can be field widened, and can be built in an all reflection configuration for UV applications, particularly FUV applications. Harlander et al. are addressing a different problem from that addressed in Okamoto et al. and approach their solution in a different manner (e.g., the use of angular shear instead of the lateral shear required by Okamato et al.). The basic concept (illustrated in FIG. 1 of this reference) is based on a Michelson type interferometer in which the return mirrors are replaced by diffractive gratings. These gratings, which disperse the radiation, produce Fizeau fringes (i.e., interferograms) which are recorded by a detector positioned in the image plane. The Fourier transform of the fringe pattern recovers the spectrum. An all reflection version of the foregoing utilizes a collimeter, a diffraction grating and two mirrors. Light from the collimeter is split into two beams by the first half of the diffraction grating, which travel in different directions until they are recombined by second half of the same grating and focused onto the detector by a mirror. This is illustrated in FIG. 2 of this reference. See also, "Spatial Hetrodyne Spectroscopy for the Exploration of Diffuse Interstellar Emission Lines at For-Ultraviolet Wavelengths," J. Harlander et al., The Astrophysical Journal, 396: 730–740, Sep. 10, 1992, and U.S. Pat. No. 5,059,027 to Roesler et al. All the designs suggested/disclosed require the use of collimated light and angular shear.

There are a number of drawbacks/limitations associated with the designs suggested/disclosed in the above referenced Harlander et al. publications and Roesler patent (collectively "Harlander et al."). First of all, Harlander et al. do not disclose the concept of imaging a spatially varying scene. Their invention is discussed in the context of imaging a star or some other type of point source. They implicitly assume that the light coming into their optical system is homogenous and report a single spectra. In many cases this may not be true, and proper measurement of the scene would require spectra for each spatial element in the scene. Secondly, all of the Harlander et al. designs require collimating the input beam. Such designs are inherently more complicated than designs which do not require collimated light. Third, the Michelson design on which their designs are based is inherently less mechanically stable than the common path design, since the interferometer is not self-compensating for motions in the elements of the interferometer. It is also not clear if the concept of Harlander et al. is applicable to instruments which utilize lateral shear, as opposed to angular shear. Fourth, although not explicitly stated, all the designs of Harlander et al. require a re-imaging lens to image the virtual sources at infinity. Finally, Harlander et al. require a complex method for separating wavelengths below the central wavelength from those above the central wavelength. That is, a detected fringe pattern could have two different interpretations, it could be from a source below the central wavelength or above. Harlander, et al. discusses methods for determining the true wavelength.

OBJECTS OF THE INVENTION

It is an object of the present invention to provide Fourier transform spectrometer that extends spectral imaging to a level where molecular absorption of emission line features can determined for a one-dimensional image.

It is another object of the present invention to provide a Fourier transform spectrometer wherein the resulting image has one dimension of spatial information and for each spatial element a wavenumber resolution spectra, and wherein a two-dimensional image can be created by scanning the field of view over the scene by, for instance, using a rotating mirror or utilizing the forward motion of the spectrometer (e.g., where it is mounted in an airplane).

It is another object of the present invention to provide a Fourier transformer spectrometer in which both the maximum spectral (Nyquist) frequency and the minimum frequency of the interferogram can be tuned to match the spectral sensitivity of the detector or the spectral region of interest without effecting the spatial resolution.

In addition, it is an object of the present invention to tailor the upper and lower cutoff frequencies to the band of interest, to provide extremely high resolutions over limited regions.

It is a further object of the present invention to provide a Fourier transformer spectrometer with the ability to tailor spectrally the bins in which the shortest and longest wavelengths reside, to allow the application of the Nyquist to only the band of interest.

It is also a further object of the present invention to better utilize the information content in the interferogram, by shifting the zero spectral frequency to a spectral frequency that the system can sense.

It is another object of the present invention to provide an interferometer which includes a set of dispersive elements to achieve the spectral resolution set forth above, while retaining spatial resolution and being unaffected by bandwidth.

It is yet another object of the present invention to achieve the foregoing in an instrument (e.g., a Fourier transform spectrometer) which is inherently spectrally calibrated.

It is yet still another object of the present invention to avoid the use of a dispersive element which adversely effects spatial performance.

It is yet a further object of the present invention to provide for an instrument that does not require collimated light.

It is yet a further object of the present invention to provide for a system that does not require a re-imaging lens.

These and other objects will be apparent from the description which follows.

SUMMARY OF THE INVENTION

This invention relates to optical instruments having, inter alia, optics to process wavelengths of electromagnetic radiation to produce an interferogram. The instruments include at least one optical path and optical elements positioned along this path for splitting the wavelengths and spectrally dispersing them to produce first and second sets of spectrally dispersed beams which interfere with each other to produce a plurality of different fringes of different wavelengths. In one group of embodiments, the optics for dispersing the wavelengths includes a matched pair of gratings. The gratings may be reflective or they may be transmissive. The gratings, where transmissive, may: take the form of acousto-optical elements; or may be on parallel surfaces of a single optical element. The optics also includes a beam splitter, positioned along the optical path for splitting the optical path, and first and second mirrors. The gratings may be positioned in a variety of locations along the optical path: between the first and second mirrors; between the beam splitter and one of the first and second mirrors; between the beam splitter and the first mirror and between the beam splitter and the second mirror; or between the beam splitter and one of the first and the second mirrors, and between the first and said second mirrors. Where acousto-optical elements are used, the instruments also include apparatus for adjusting the frequency of the sound used to drive the acousto-optical elements to produce a variable amount of spectral dispersion and thereby adjust the spectral performance of the instrument.

In another group of embodiments, the splitting and dispensing of the wavelengths is accomplished only by the matched pair of gratings. Again, the gratings may transmissive, including AO elements, or reflective. Where transmissive, the gratings are aligned along the optical path in parallel planes, to both split and disperse the wavelengths. The optical system in this case also includes a pair of mirrors positioned between the gratings and on opposite sides of the optical path to fold the split and dispersed wavelengths back toward the optical path. A block is also positioned in the optical path between the gratings to block any undiffracted radiation from continuing along the optical path.

In a third embodiment, the optics for dispersing the wavelengths includes a mirror having a plurality of reflecting surfaces, wherein each of the surfaces reflects a specific wavelength or range of wavelengths within a preselected range of different wavelengths. The mirror has a front surface and the plurality of reflecting surfaces includes the front surface and a series of surfaces parallel to but below the front surface. The plurality of reflecting surfaces is obtained by a series of coatings, each of which reflects specific wavelengths or ranges of wavelengths. In addition, a second mirror having a plurality of reflective surfaces could also be utilized. Thus, the spread between the "red" and "blue" can be spread between two mirrors instead of being just on one.

Finally, the optical system may include a beam splitter for dividing the optical path, a mirror positioned along the optical path, and a grating positioned along the optical path, wherein the mirror is rotatable about an axis perpendicular to the plane of the optical path to produce angular shear.

The instruments can all include a detector for detecting the interferogram and means for processing the detected interferogram to produce spectral information. The instruments can further include a slit positioned along the optical path, a detector for detecting the interferogram positioned along the optical path, and optics for focusing the slit on the detector.

The invention also includes the method of spectrally dispersing the wavelengths to produce first and second sets of spectrally dispersed beams which interfere with each other to produce a plurality of different fringes of different wavelengths with the described instrumentation.

DESCRIPTION OF THE PREFERRED EMBODIMENTS

With reference to FIG. 1, Fourier transform spectrometer 11 processes an incident light source 13 through an aperature 15, to a beam splitter 17, where source 13 is divided into a reflected beam (represented by central ray path 19) and a transmitted beam (represented by central ray path 21). The portion of source 13 represented by path 19 is reflected from the front surface a first mirror 23 to the front surface a second mirror 23, and then back to beam splitter 17. The second, transmitted portion of source 13 is reflected off second mirror 23, back to first mirror 23 and through beam splitter 17. Thus, beam splitter 17, together with mirrors 23 and 25, serve to split incident source 13 into two portions. Spectrometer 11 also includes a detector 27 which is placed at the back focal plane of spherical (Fourier) lens 29. (Aperature 15 is in the front focal plane.) A second, cylindrical lens 31, is interposed between detector 27 and spherical lens 29, which images spatial locations from 15 onto detector 27. As is well understood in the art, this basic arrangement produces an interfering light pattern or fringe pattern at the focus of spherical lens 29, commonly referred to as an interferogram. Cylindrical lens 31 images the relative physical distribution in source 13 such that as it impinges on detector 27 and represents the relative spacing for the various sources and their locations in source 13. The detector 27 is a charge-coupled device, or CCD. Alternatively, any photon counting array or photon noise limited device may be used. The output of detector 27 is processed by a computer 33 using Fourier transform techniques as is well known in the art to resolve the spectrum detected by detector 27.

To correct the problems inherent in the interferometer of Okamoto et al., and achieve the objectives set forth above, a pair of matched gratings are incorporated into the interferometer of the present invention. Thus, with reference to spectrometer 34 schematically illustrated FIG. 2, interposed along optical path, between mirrors 23 and 25, are first 35 and second 37 matched (i.e., identical) gratings. Alternately, as those skilled in the art will appreciate, the pair of matched gratings can be placed in the optical path between beam splitter 17 and one of the mirrors. This is illustrated in FIG. 3, where the interferometer of spectrometer 39 includes, in beam splitter 17, first and second mirrors 23, 25, and matched gratings 41 and 43. The embodiment of FIG. 3 is a similar embodiment to the invention depicted in FIG. 2. However, in this second embodiment, the distance between the gratings is longer and, thus, lower groove densities (i.e., a smaller number of lines per millimeter) on the gratings can be used.

Figure 2:
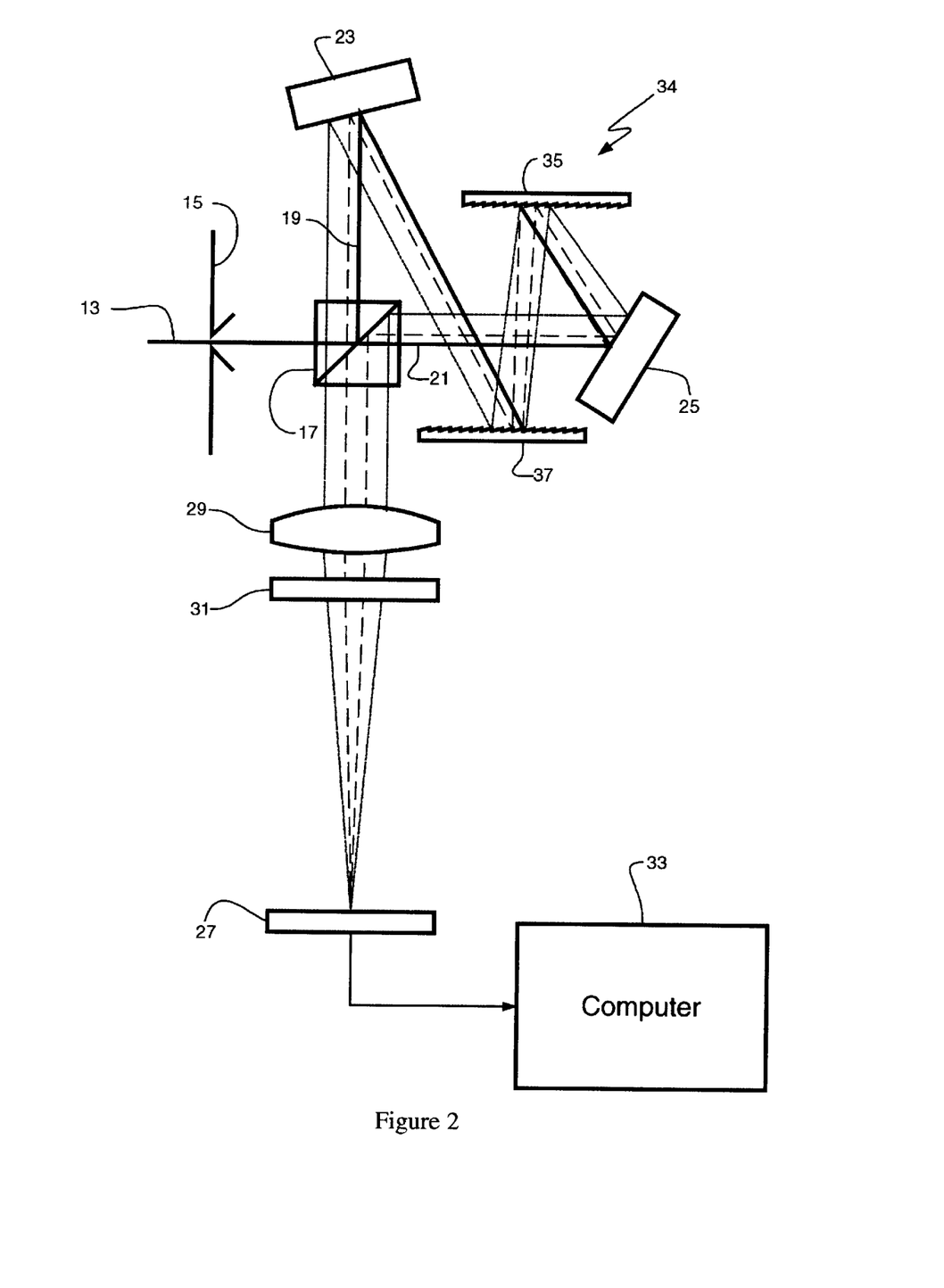
FIG. 2 is an optical schematic of the first embodiment of the present invention incorporated in a Sagnac interferometer.
Figure 3:
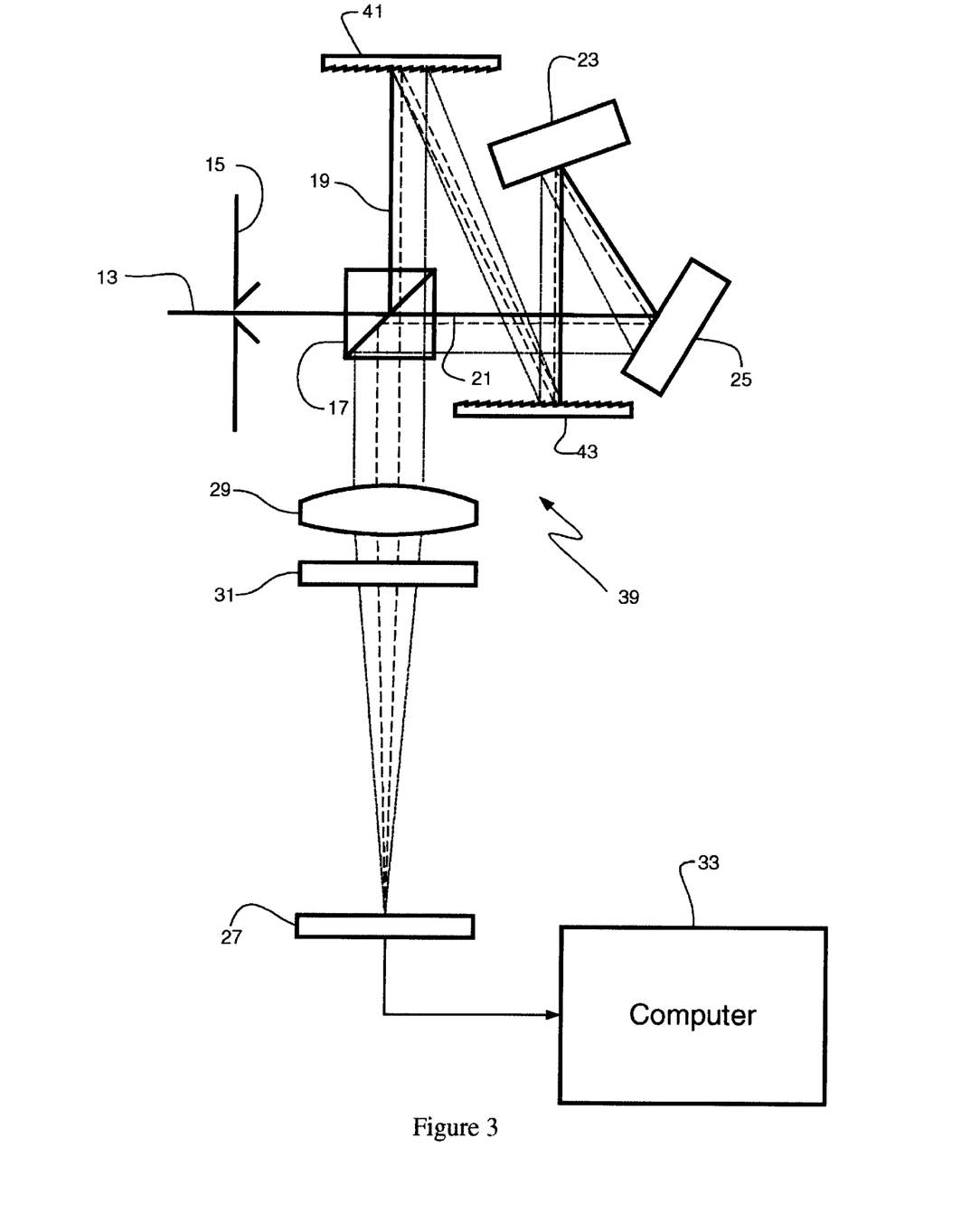
FIG. 3 is an optical schematic of the second embodiment of the present invention also incorporated in a Sagnac interferometer.
Figure 4:
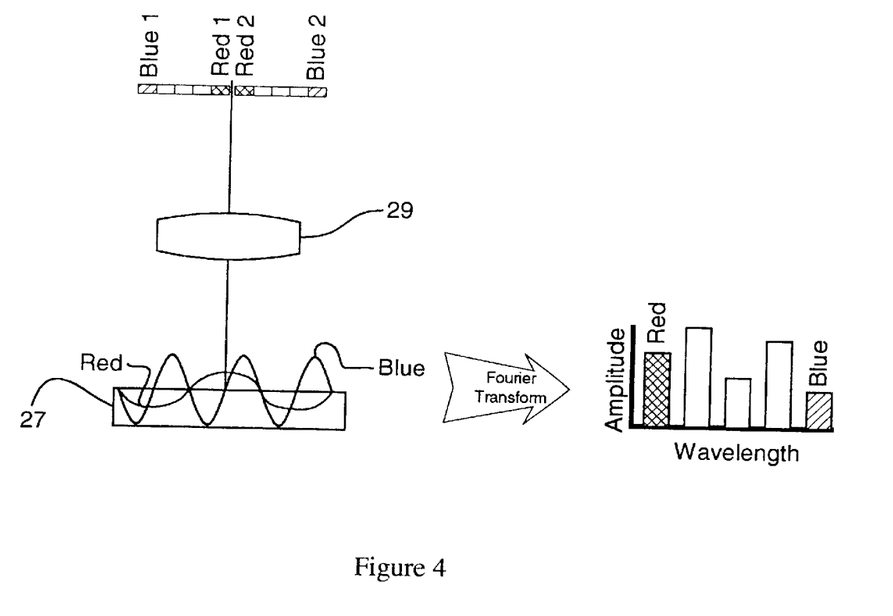
FIG. 4 is an optical schematic of the present invention illustrating how different wavelengths of light are spread at the input plane and how these sources interfere to produce fringe patterns of different spectral frequencies on the detector.

The optical designs set forth in FIGS. 2 and 3 solve the loss of spatial resolution problem inherent in an imaging system based on Okamoto design by employing a pair of gratings to produce the needed lateral shear. These designs also allow an easy adjustment of the amount of lateral shear in the system, without introducing any longitudinal shear, because the gratings will diffract light in only a plane perpendicular to the grooves. At the same time, the grating pairs retain the bandwith tuning features of the dispersive block.

The benefits of the above described embodiments can be understood by examining Young's two slit experiment. There light emerging from the two slits interfere and produce a sinusoidal pattern on a distant screen. The period or frequency of the sinusoidal pattern is a function of the separation of the two slits and the spectra of the source. In all the embodiments of the present invention, the dispersive elements are selected so that the two "red" (i.e., long) wavelengths have a close separation between the two slits, while the two "blue" (i.e., short) wavelengths have a wide separation. Thus, the corresponding sinusoidal pattern for the "red" wavelengths would be a broad, slowly varying pattern, while the "blue" wavelengths have a short, fast varying pattern. Once the specific "red" and "blue" wavelengths (or minimum and maximum cutoff wavelengths) have been chosen for the system, an optical design is selected utilizing the criteria set forth below, such that the "red" wavelengths emerge from the interferometer with a close spacing and corresponding slow frequency that can be detected, while "blue" wavelengths come out with a wide spacing and corresponding spatial frequency that matches the Nyquist limit for the detector.

Figure 5:
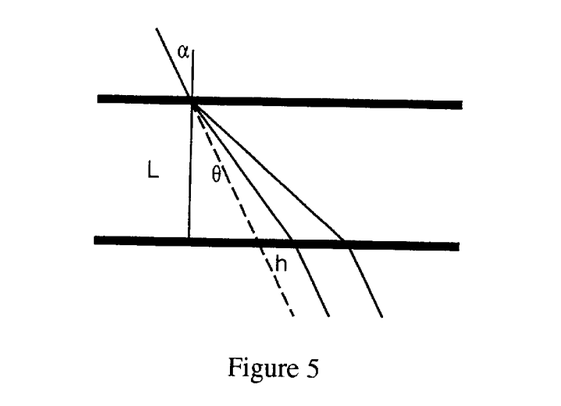
FIG. 5 is an optical schematic illustrating two parallel gratings according to the present invention, and that the light existing the second grating has an offset inversely proportional to the wave number.

To determine the resolution enhancement thereof, as well as the operational parameters, it is necessary to consider the relationship between the amount of shear or offset ret (h) introduced by the grating, as a function of wavenumber ($\sigma$), the distance between the gratings (l), the grating pitch (d), the grating order (m) and the blaze angle ($\alpha$). Using this relationship and the desired minimum and maximum wavenumbers, the necessary grating separation and the Sagnac mirror offset can be determined. With reference to the two parallel gratings 21, 23 as depicted in FIG. 5, the light exiting the second grating will have an offset inversely proportional to the wavenumber.

Thus:

$$h(\sigma) = l\tan(\theta) - l\tan(\alpha) \quad (1)$$

Using the grating equation ($\sin\theta = m\lambda/d - \sin\alpha$) to determine the diffracted angle leads to:

$$h(\sigma) = \frac{l(m\lambda/d - \sin(\alpha))}{\sqrt{1 - (m\lambda/d - \sin(\alpha))^2}} - l\tan(\alpha) \quad (2)$$

The total offset within the Sagnac interferometer can be written in terms of the shift due to the grating pair, the mirror offset (a) from its symmetric point, and the shift due to inherent dispersion in the optics used (h'($\sigma$)). Thus:

$$L(\sigma) = 2h(\sigma) - \sqrt{2}a + 2\delta\sigma + 2\beta \quad (3)$$

The $m^{th}$ piece of the interferogram detected by the $m^{th}$ detector of N detectors located in the focal plane of the Fourier lens of focal length f can be expressed as:

$$i_m = \int_{\sigma\min}^{\sigma\max} s(\sigma)\cos(2\pi\sigma L(\sigma)(\Delta m - \phi)/f)d\sigma \quad (4)$$

where s is the source spectrum, $\Delta$ is the pitch of the detector array, and $\phi$ is the distance between the center of the zero$^{th}$ cell and the optical axis; $\sigma_{min}$ and $\sigma_{max}$ are the lower and upper bounds of the effective spectral range. The magnitude of the discrete Fourier transform of $i_m$, m=0, 1, ... N–1, with respect to m results in a discrete spectral distribution $I_k$:

$$I_k = \left|\sum_{m=0}^{N-1} i_m \exp(-2i\pi mk/N)\right| \quad (5)$$

Using the method of stationary phase, the above sum and integral produces a non-zero result only when the exponential terms are zero. This implies that:

$$\sigma L(\sigma) + \frac{kf}{\Delta N} = 0 \quad (6a)$$

or equivalently $$2\delta\sigma^2 + 2l\sigma\frac{m/d\sigma - \sin(\alpha)}{\sqrt{1 - (m/d\sigma - \sin(\alpha))^2}} -$$

$$2l\sigma\tan(\alpha) - \sqrt{2}\,a\sigma + 2\beta\sigma + \frac{kf}{\Delta N} = 0 \quad (6b)$$

The minimum wavenumber can be determined from Eq. (6b), when k is replaced with 0. Similarly, the maximum wavenumber can be found from the same equation, when k is replaced with N/2. A simple expression for these values is not easily found. However, approximate values for the minimum and maximum wavenumbers can be found, if the incident light is normal to the grating, the diffraction is small (m/d$\sigma$–sin($\alpha$))<<1) and the intrinsic dispersion is ignored. Thus:

$$\sigma_{\min} \approx \frac{\sqrt{2}\, ml}{ad} \quad (7a)$$

$$\sigma_{\max} \approx \frac{\sqrt{2}}{a}\left(\frac{ml}{d} + \frac{f}{2\Delta}\right) \quad (7b)$$

Alternatively, by assuming desired values of the minimum and the maximum wavenumber, and selecting appropriate values for the grating pitch (d), the grating order (m), detector pitch ($\Delta$), and the focal length of the Fourier lens, the distance between the gratings (l) and the mirror offset (a) can be determined. An exact relationship can be found from Equation (6b), by replacing $\sigma$ and k with the minimum wavenumber and 0, respectively. A second equation can be created by replacing $\sigma$ and k with the maximum wavenumber and N/2. From these two equations, expressions for the mirror offset (a) and the distance between the gratings (l) can be determined as follows:

$$l = \left(\frac{f}{4\Delta\sigma_{\max}} + \delta(\sigma_{\max} - \sigma_{\min})\right) \quad (8)$$

$$\left(\frac{m/d\sigma_{\min} - \sin(\alpha)}{\sqrt{1 - (m/d\sigma_{\min} - \sin(\alpha))^2}} - \frac{m/d\sigma_{\max} - \sin(\alpha)}{\sqrt{1 - (m/d\sigma_{\max} - \sin(\alpha))^2}}\right)^{-1}$$

These equations lead to the following fairly lengthy equations for the grating separation and the mirror offset in terms of the minimum and maximum wavenumbers:

$$l = \frac{\left(\frac{f}{4\Delta\sigma_{\max}} + \delta(\sigma_{\max} - \sigma_{\min})\right)\sqrt{1 - (m/d\sigma_{\min} - \sin(\alpha))^2}\sqrt{1 - (m/d\sigma_{\max} - \sin(\alpha))^2}}{(m/d\sigma_{\min} - \sin(\alpha))\sqrt{1 - (m/d\sigma_{\max} - \sin(\alpha))^2} - (m/d\sigma_{\max} - \sin(\alpha))\sqrt{1 - (m/d\sigma_{\min} - \sin(\alpha))^2}} \quad (9)$$

$$a = \sqrt{2}\,\delta\sigma_{\min} + \sqrt{2}\,\beta + \quad (10)$$

$$\frac{\left(\frac{f}{4\Delta\sigma_{\max}} + \delta(\sigma_{\max} - \sigma_{\min})\right)\left(m/d\sigma_{\min} - \sin(\alpha) - \tan(\alpha)\sqrt{1 - (m/d\sigma_{\min} - \sin(\alpha))^2}\right)\sqrt{1 - (m/d\sigma_{\max} - \sin(\alpha))^2}}{(m/d\sigma_{\min} - \sin(\alpha))\sqrt{1 - (m/d\sigma_{\max} - \sin(\alpha))^2} - (m/d\sigma_{\max} - \sin(\alpha))\sqrt{1 - (m/d\sigma_{\min} - \sin(\alpha))^2}}$$

Using the expressions for l and a given in Equation 9 and 10 in Eq. (6b), a general equation for the wavenumber for the $k^{th}$ bin can be found in determined. Given the complexity of Eq. (6b), it is easier to find k in terms of the $k^{th}$ wavenumber, and the maximum and minimum wavenumbers. Thus:

$$k = \frac{2\delta\Delta N\sigma_k}{f}(\sigma_{\min} - \sigma_k) + \frac{2\Delta N\sigma_k}{f} \quad (11)$$

$$\left(\frac{f}{4\Delta\sigma_{\max}} + \delta(\sigma_{\max} - \sigma_{\min})\right)\left(\frac{\frac{m/d\sigma_{\min} - \sin(\alpha)}{\sqrt{1 - (m/d\sigma_{\min} - \sin(\alpha))^2}} - \frac{m/d\sigma_k - \sin(\alpha)}{\sqrt{1 - (m/d\sigma_k - \sin(\alpha))^2}}}{\frac{m/d\sigma_{\min} - \sin(\alpha)}{\sqrt{1 - (m/d\sigma_{\min} - \sin(\alpha))^2}} - \frac{m/d\sigma_{\max} - \sin(\alpha)}{\sqrt{1 - (m/d\sigma_{\max} - \sin(\alpha))^2}}}\right)$$

Figure 6:
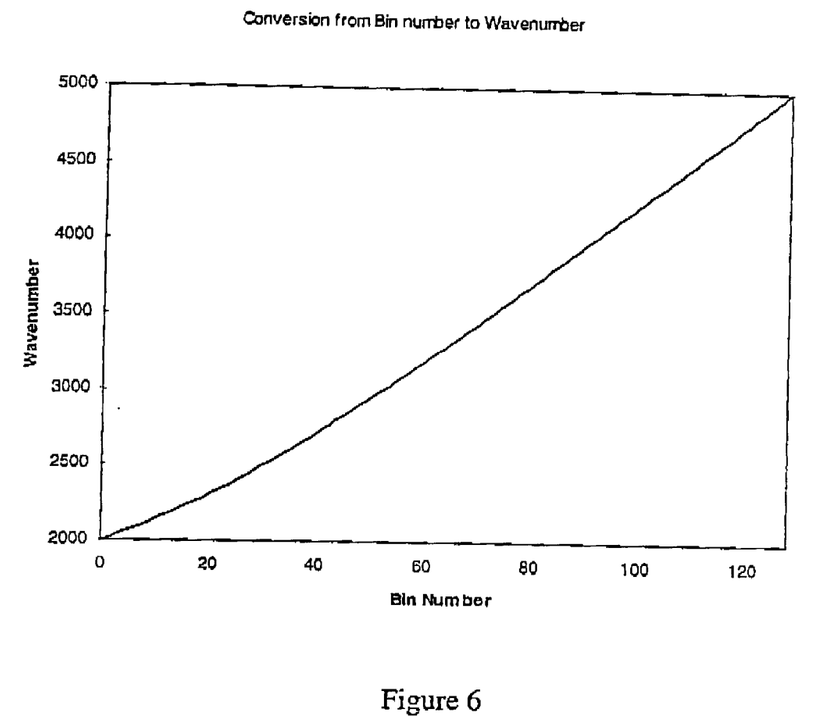
FIG. 6 is a graph illustrating bin number vs. wavelength for a system utilizing a 150 l/mm grating.

Equation 11 demonstrates the relationship between the minimum and maximum wavenumbers, the focal length of the Fourier lens and the grating pair parameters. A plot of Equation 11 is shown in FIG. 6, for a 150 l/mm grating used in the first order at 8 degrees. The array size was chosen to be 256 detectors. The minimum and maximum wavenumbers were chosen to be 2000 and 5000 cm$^{-1}$, respectively. The relationship between wavenumber and bin is nonlinear, but roughly follows a quadratic relationship. However, by utilizing a different set of grating parameters, a nearly linear relationship can be established.

Figure 7:
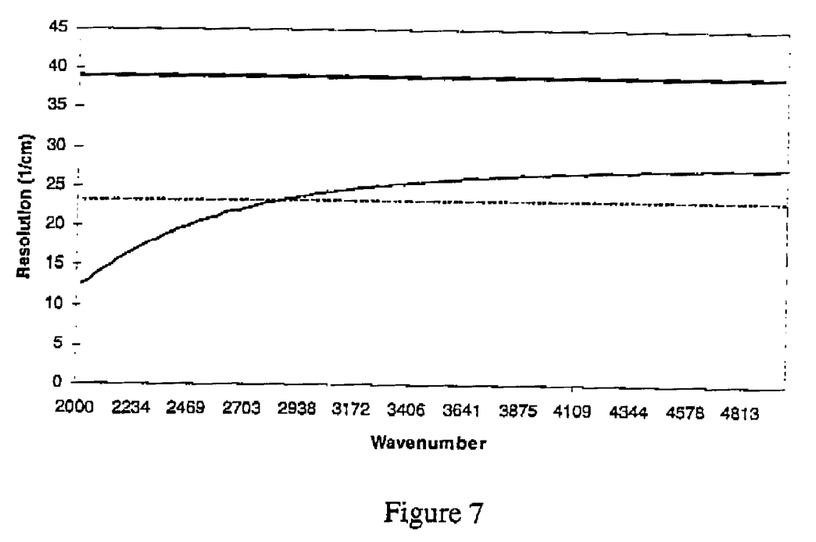
FIG. 7 is a graph illustrating spectral resolution vs. wavenumber for a system utilizing a 150 l/mm grating.

The nonlinear nature of Equation 11 is best illustrated by plotting the wavenumber per bin (i.e., spectral resolution) as a function of wavenumber, as shown in FIG. 7. All the bins have a better spectral resolution than a system (such as illustrated in FIG. 1) without any grating dispersion ($\Delta\sigma=39$ cm$^{-1}$). The linear line corresponds to the spectral range divided equally among the 128 different bins ($\Delta\sigma=23$ cm$^{-1}$). Thus, for the longer wavelengths (smaller wavenumbers) the enhancement is greater than for shorter wavelengths. If a coarser grating is employed, as used in the embodiment of FIG. 3, the resolution approaches a constant ($\Delta\sigma=23$ cm$^{-1}$). However, the distance between the gratings increases making the system a much higher F number system, which adversely affects the optical throughput of the system. With the grating setup as illustrated in, for instance, FIG. 9 (discussed below), the gratings would be placed 0.75 cm apart, a reasonable separation distance for a transmission grating. For reflection gratings a larger separation is needed, requiring a much coarser grating to be utilized. By judicious choice of the grating pitch, and operational angle, a more linear relationship between spectral resolution and bin number can be found.

As the product of the grating spacing and the wavenumber approaches the grating order, the term within the square root of Equation 11 will go negative, and square root will become imaginary. This non-physical situation occurs when the light is diffracted through an angle larger than ninety degrees. If the product of the wavenumber and grating spacing is large, then Equation 11 is weakly dependent on the sine of the incident angle. Otherwise, it will limit the smallest wavenumber that the system can utilize. The grating order can be used increase the grating pitch. A 300 l/mm grating used in the second order will have the same amount of lateral shear as a 150 l/mm grating used in the second order. As the product of the grating spacing and the wavenumber approaches the grating order.

Figure 8:
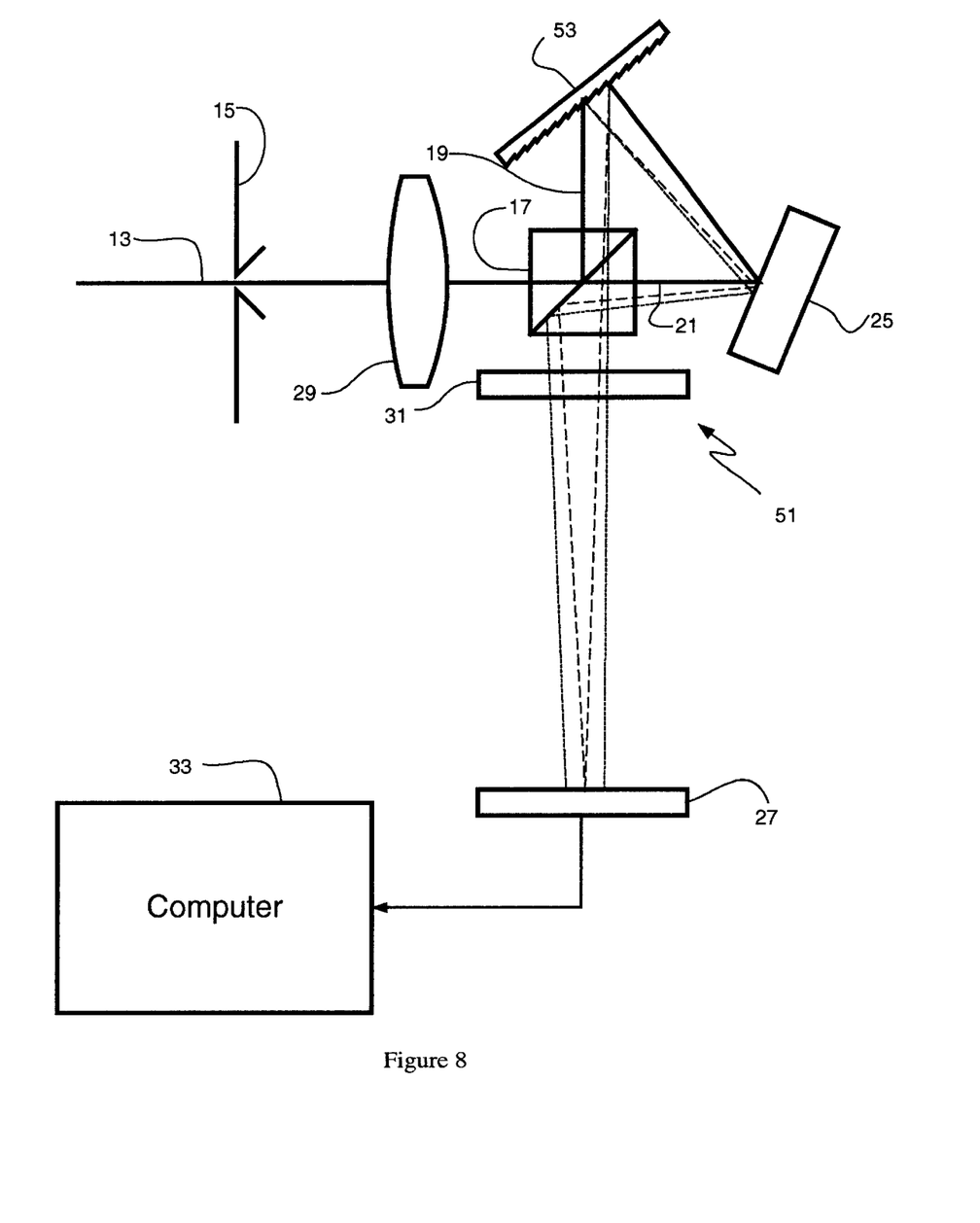
FIG. 8 is an optical schematic of the third embodiment of the present invention incorporated in a Barnes interferometer.

The development set forth in the preceding section is not directly applicable to interferometers utilizing angular shear instead of lateral shear. However, the enhancement technique is still applicable. A conventional angular shearing common path interferometer, as discussed by Barnes and Turner, utilizes three mirrors and a beamsplitter arranged in a square configuration. The middle mirror, the mirror on the opposite corner of square from the beamsplitter, is tilted slightly to introduce an angular shear in the beam paths, the clockwise path getting an angular deviation exactly opposite from the counter-clockwise beam. To spectrally enhance instruments incorporating this type of interferometer, are of thetwo of the mirrors of spectrometer 51 is replaced by a grating 53, as shown in FIG. 8. The construction and selection of the grating parameters are such that the angular deviation for the "red" paths is small, while the angular deviation of the "blue" paths is large. The resulting fringe pattern on the detector for the "red" interference is a slowly varying wave, while the "blue" fringe pattern is a fast variation, close to the Nyquist limit of the detector. Though, as those skilled in the art will appreciate, Fourier lens 29 is located between slit 15 and beam splitter 17, this lens and the other components of spectrometer 51 function the same as in the previously discussed embodiments.

Figure 9:
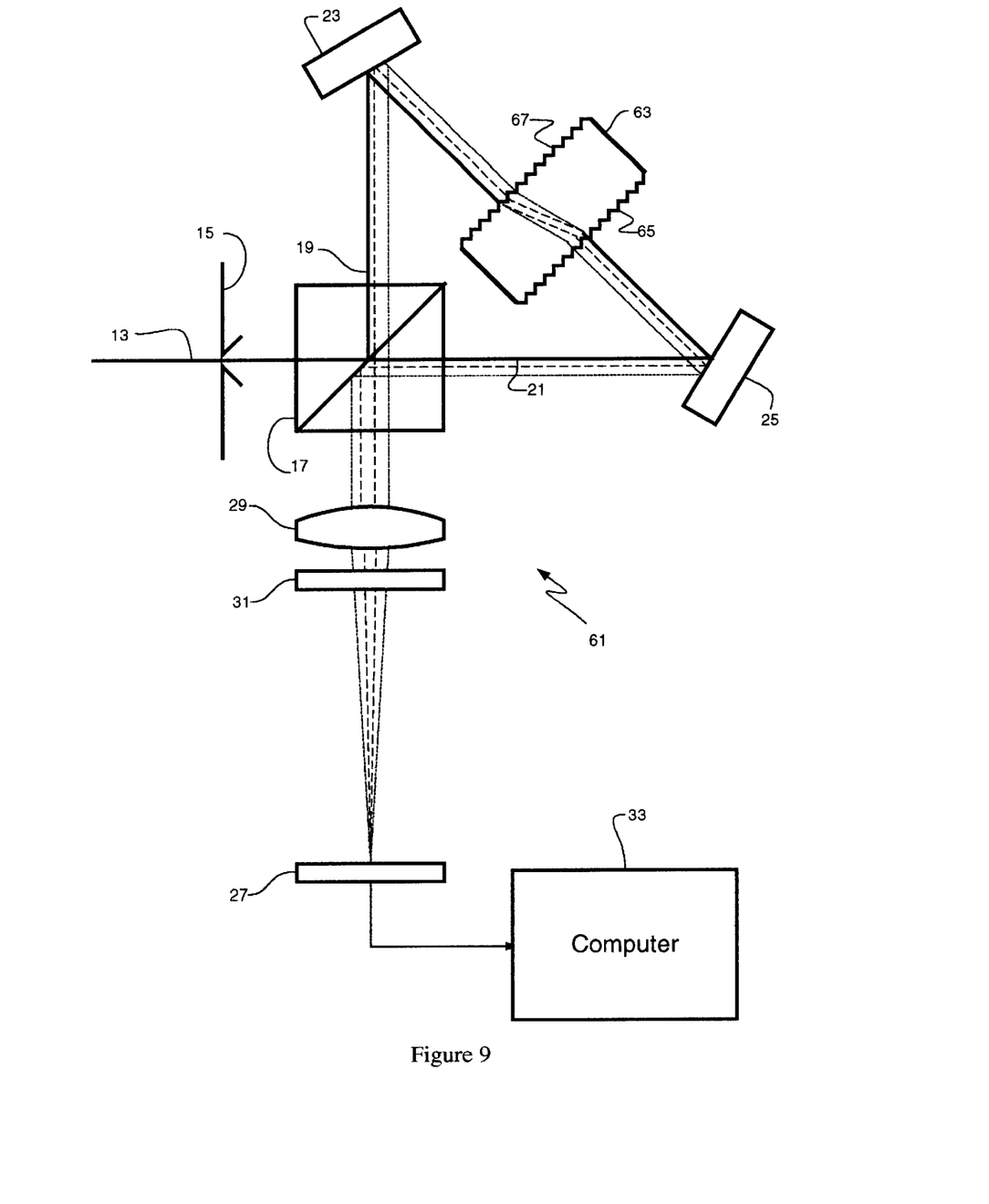
FIG. 9 is an optical schematic of an alternate embodiment of the invention incorporated in a Sagnac interferometer in which the matched gratings are on a single optically transmissive element.

With reference to FIG. 9, Fourier transform spectrometer 61 processes incident light source 13 in much the same manner as spectrometer 34. Source 13 passes through aperture 15 to beam splitter 17 where it is divided into a reference beam (represented by central ray path 19) and a transmitted beam (represented by central ray path 21). The portion of source 13 represented by path 19 is, as before, reflected from first mirror 23 to second mirror 23, and then back to beam splitter 17. The transmitted portion, represented by beam path 21 is reflected first off mirror 23, back to mirror 23 and then through beam splitter 17. Thus, beam splitter 17, together with mirrors 23 and 25, serve to split incident source 13 into two beams. Spectrometer 61 also includes a detector 27 which is placed at the focus of Fourier lens 29 and cylindrical lens 31. The embodiment of FIG. 9 differs from those of FIGS. 2 and 3 in that it includes a single optical element 63, having parallel diffraction gratings 65 and 67, positioned between mirrors 23 and 25. In operation, spectrometer 61 functions in the same manner as spectrometers 34 and 39. Gratings 65 and 67 spectrally disperse the wavelength of source 13 to produce first and second sets of spectrally dispersed Beams. The choice of grating pitch, grating order, etc., are determined in the manner as set forth above with regard to the embodiments of FIGS. 2 and 3. As those skilled in the art will appreciate, the substrate material properties need to be incorporated into Equation 11 by modifying the grating equation to include the index of refraction of the media. This leads to a modified version of Equation 11, where the sine terms are multiplied of the index of refraction of the substrate material as a function of wavenumber $$\left(\text{i.e.,}\quad n_1(\sigma)\sin(\theta) = \frac{m\lambda}{d} - n_2(\sigma)\sin(\alpha)\right)$$

Figure 10:
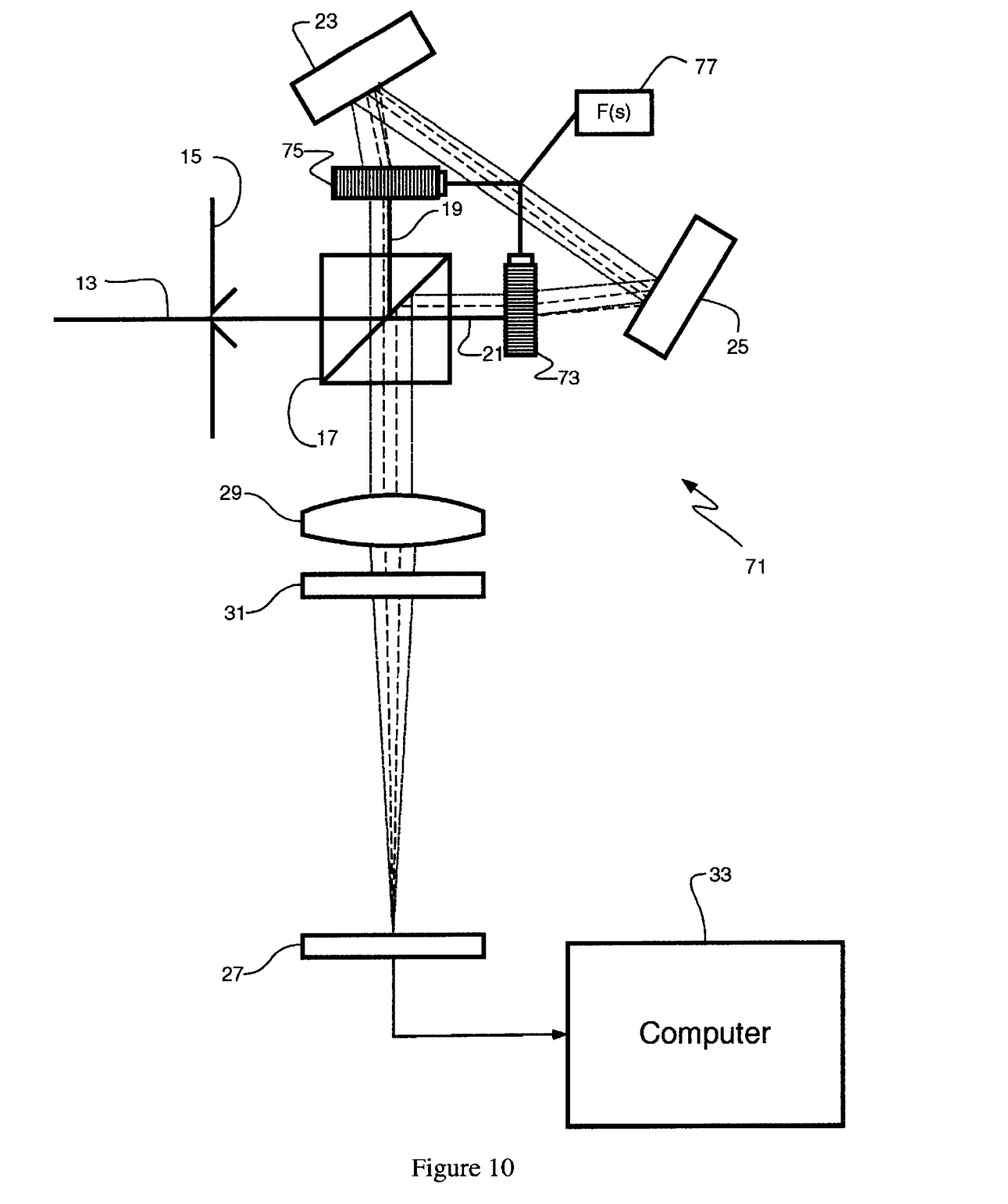
FIG. 10 is an optical schematic of the embodiment of the present invention which utilizes acousto-optic cells incorporated in a Sagnac interferometer.

In Fourier transform spectrometer 71 illustrated on FIG. 10, the matched pair of gratings (e.g., gratings 35, 37) is replaced by a pair of acousto-optical (AO) elements 73, 75, positioned in paths 19 and 21. Alternately, they could both be positioned between mirrors 23 and 25. The end result is identical to the previous embodiments of the invention. That is, AO elements 73, 75 spectrally disperse the wavelengths of source 13 to produce first and second sets of spectrally dispersed beams. The amount of dispersion is determined by index grating in the AO elements. The index grating is a function of the material properties of the AO elements and the frequency of sound used to drive the elements. The amount of acoustic power generated by frequency source 77 determines the amplitude of the index grating and, thus, the diffraction efficiency of the AO elements.

Figure 11:
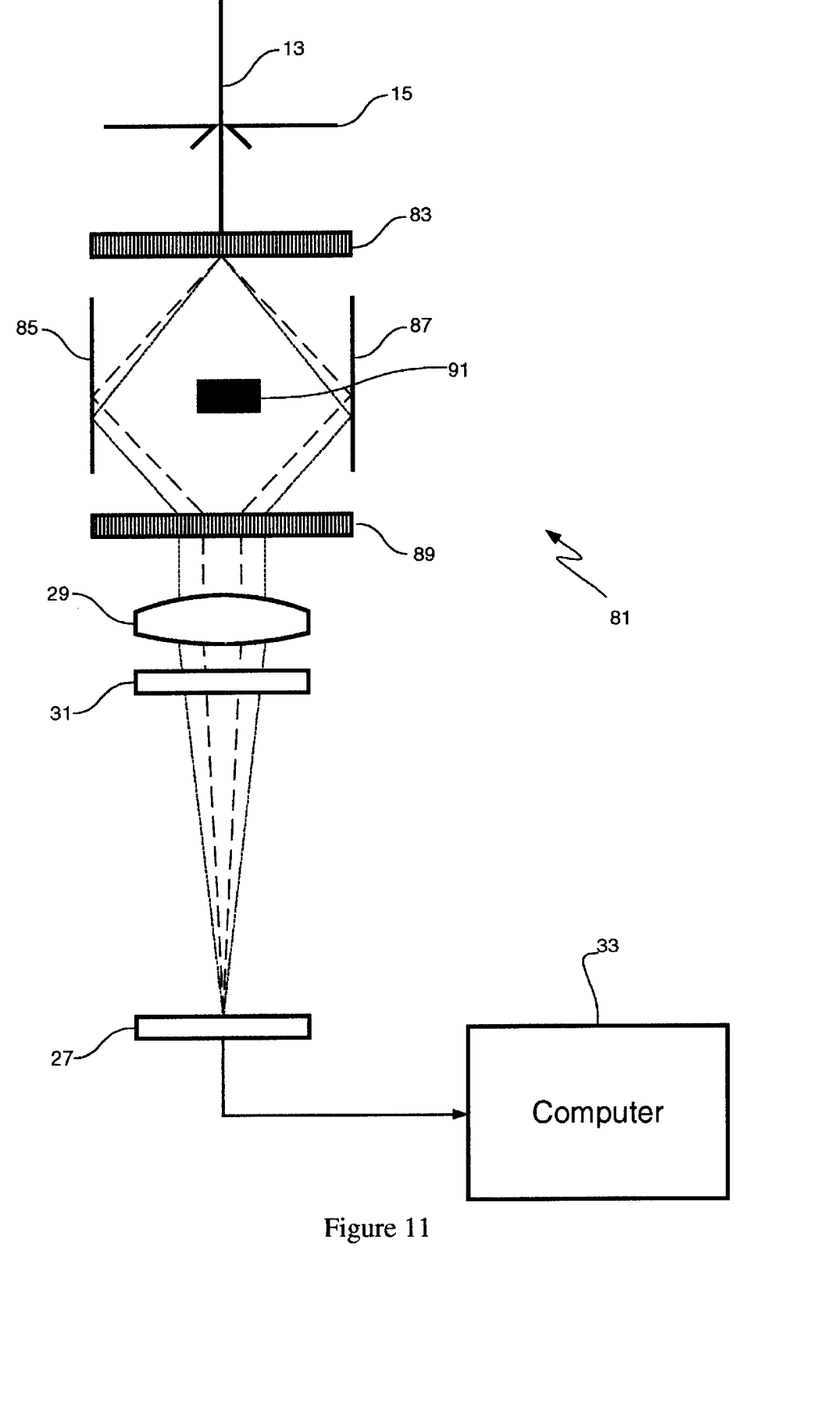
FIG. 11 is an optical schematic of an additional embodiment of the present invention in which a matched pair of gratings, in conjunction with a pair of mirrors, both split and disperse the incoming wavelengths.

In FIG. 11, Mach-Zender interferometer 81 includes a slit 15, a first diffraction grating 83, a pair of first surface mirrors 85 and 87, and a second diffraction grating 89. Interferometer 81 does not include a separate beam splitter element as gratings 83 and 89, which are a matched pair, both split source 13 into two beams and disperse such split beams. Mirrors 85 and 87 serve to direct the split beams back toward grating 89, which, in turn, combines the two beams and removes the spectral dispersion introduced by the first grating 83. The beam block 91 prevents undiffracted light from continuing. The resulting first and second sets of spectrally dispersed beams are then focused on detector 27, via Fourier lens 29 and cylindrical lens 31. And, as with the previously discussed embodiments, the output of detector 27 is processed by computer 33 using Fourier transform techniques, as is well understood in the art, to resolve the detected spectrum. The specific parameters of the gratings are determined as set forth above with regard to the embodiments of FIGS. 2 and 3. An advantage of this embodiment is that the system can be made out of entirely reflective optics, without any need for a transmissive beamsplitter. This requires the use of reflective gratings (instead of transmissive gratings 83 and 89) and a folded "Z" design. In such a design the optical path 13 travels underneath the second grating to the first grating, which is titled at a slight angle. The reflected beams then travel backwards towards the mirrors 85 and 87, to the second grating which is titled in a compensating angle. The light reflecting off the second grating then travels towards a curved mirror which serves the same function as the lenses 29 and 31. Looking at the optical system from the side, the optical path follows a "Z". This alternate design is of importance for extreme ultraviolet, where the optical material may absorb the incoming radiation, or long wave infrared, where the materials emit radiation that may be difficult to distinguish from the desired radiation to be measured. Although it would not be on all reflective surface, gratings 83, 89 could be replaced by a pair of AO elements.

Figure 12:
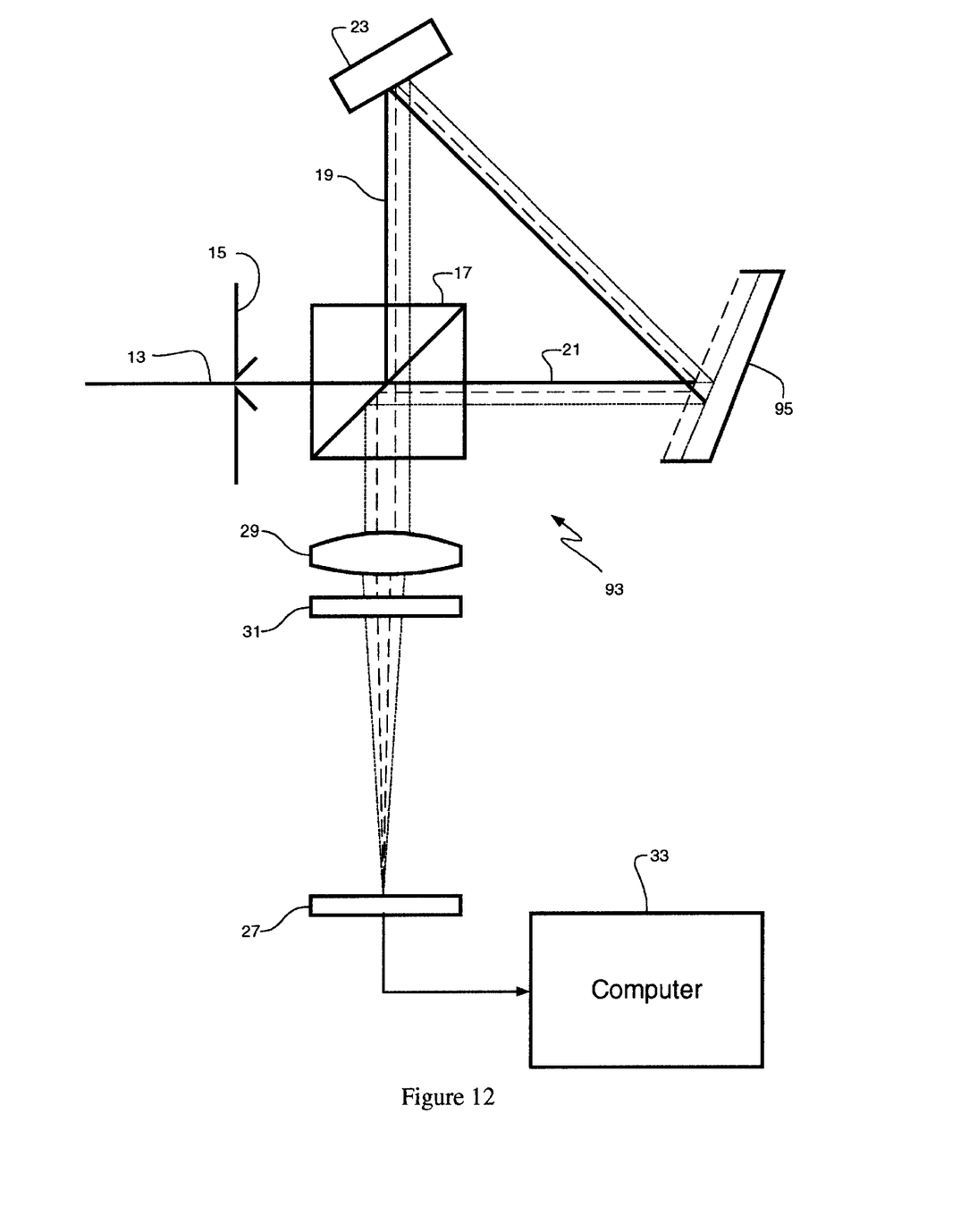
FIG. 12 is yet another embodiment of the present invention wherein, in place of a pair of matched gratings, a mirror which reflects different wavelengths at different depths from its front surface is utilized.

The Fourier transform spectrometer 93 of FIG. 12 utilizes a mirror 95 which has coatings of a layered nature which reflect different wavelengths of light at different depths relative to its front surface. Otherwise, the spectrometer 93 has the same basic optical components as that of spectrometers 34 and 39. Conceptually, this embodiment can be understood by envisioning the superposition of a multitude of Sagnac interferometers, where each spectrometer is specialized for a particular wavelength or range of wavelengths and has a corresponding mirror offset (d of FIG. 1), such that the mirror offset for the "red" wavelength is small and the mirror offset for the "blue" is large, and the wavelengths in between are appropriately spaced. Additionally, a second mirror having the same or different coatings can be utilized in place of mirror 23. In such an arrangement, the desired spreads between the "red" and "blue" wavelengths is split, in some fashion (e.g., 1/3, 2/3; 1/2, 1/2; 1/4, 3/4), between two mirrors rather than being achieved by coatings on just one mirror.

Whereas the drawings and accompanying description have shown and described the preferred embodiment of the present invention, it should be apparent to those skilled in the art that various changes may be made in the form of the invention without affecting the scope thereof.

I claim:

1. An optical instrument having means to produce a spectral image from wavelengths of electromagnetic radiation tuned to match a spectral region of interest, said instrument comprising:

a. an optical path;

b. an aperture positioned along said optical path;

c. a common path interferometer including a beam splitter for separating said wavelengths into two equal beams and means to cause a phase shift so that said two equal beams interfere with each other;

d. means for spectrally dispersing the said two optical beams and spectrally tailoring said beams to an electromagnetic wavelength band of interest; and e. means to focus said aperture onto a detector to produce an interferogram.

2. The optical instrument of claim 1, wherein said means for spectrally dispersing the said two optical beams are located within said interferometer and are in parallel planes.

3. The optical instrument of claim 2, wherein said means to cause a phase shift includes first and second reflective surfaces.

4. The optical instrument of claim 3, wherein said means for spectrally dispersing the said two optical beams is a single pair of co-planar reflective optical devices.

5. The optical instrument of claim 4, wherein said means for spectrally dispersing the said two optical beams are located between said beam splitting means and one of said first and second reflective surfaces.

6. The optical instrument of claim 4, wherein said means for spectrally dispersing the said two optical beams are located between said first reflective surface and said second reflective surface.

7. The optical instrument of claim 4, wherein one of said pair of co-planar reflective optical devices is located between said beam-splitting means and one of said first and second reflective surfaces, and wherein the other of said pair of co-planar reflective optical devices is located between one of said first reflective surface and said second reflective surface, and said beam splitting means and the other of said first and second reflective surfaces.

8. The optical instrument of claim 3, wherein said means for spectrally dispersing the said two optical beams is a single pair of co-planar transmissive optical devices.

9. The optical instrument of claim 8, wherein said means for spectrally dispersing the said two optical beams are located between said beam splitting means and one of said first and second reflective surfaces.

10. The optical instrument of claim 8, wherein said means for spectrally dispersing the said two optical beams are located between said first reflective surface and said second reflective surface.

11. The optical instrument of claim 8, wherein one of said pair of co-planar transmissive optical devices is located between said beam-splitting means and one of said first and second reflective surfaces, and wherein the other of said pair of co-planar transmissive optical devices is located between one of said first reflective surface and said second reflective surface, and said beam splitting means and the other of said first and second reflective surfaces.

12. The optical instrument of claim 1, wherein said means to focus said aperture onto said detector includes a spherical lens and a cylindrical lens.

13. The optical instrument in claim 1, further including means to process said interferogram to produce spectral information.

* * * * *